(12) United States Patent
Hoelzl

(10) Patent No.: US 11,644,013 B2
(45) Date of Patent: May 9, 2023

(54) NACELLE FOR A WIND TURBINE

(71) Applicant: Miba Gleitlager Austria GmbH, Laakirchen (AT)

(72) Inventor: Johannes Sebastian Hoelzl, Berg im Attergau (AT)

(73) Assignee: Miba Gleitlager Austria GmbH, Laakirchen (AT)

(*) Notice: Subject to any disclaimer, the term of this patent is extended or adjusted under 35 U.S.C. 154(b) by 57 days.

(21) Appl. No.: 17/612,430

(22) PCT Filed: May 19, 2020

(86) PCT No.: PCT/AT2020/060206
§ 371 (c)(1),
(2) Date: Nov. 18, 2021

(87) PCT Pub. No.: WO2020/232495
PCT Pub. Date: Nov. 26, 2020

(65) Prior Publication Data
US 2022/0243706 A1 Aug. 4, 2022

(30) Foreign Application Priority Data

May 21, 2019 (AT) ............................. A 50465/2019

(51) Int. Cl.
*F03D 80/70* (2016.01)
*F03D 15/00* (2016.01)

(52) U.S. Cl.
CPC .............. *F03D 80/70* (2016.05); *F03D 15/00* (2016.05); *F05B 2240/14* (2013.01); *F05B 2240/50* (2013.01); *F16C 2300/14* (2013.01); *F16C 2360/31* (2013.01)

(58) Field of Classification Search
CPC ..... F03D 80/70; F03D 15/00; B05B 2240/14; B05B 2240/50; F16C 2260/31
See application file for complete search history.

(56) References Cited

U.S. PATENT DOCUMENTS

| 10,598,214 | B2 | 3/2020 | Hoelzl |
| 10,669,997 | B2 | 6/2020 | Mtauweg |
| 10,844,905 | B2 | 11/2020 | Meyer |
| 10,935,072 | B2 | 3/2021 | Lueneburg et al. |

(Continued)

FOREIGN PATENT DOCUMENTS

| DE | 10 2004 028 746 A1 | 12/2005 |
| DE | 10 2010 063 687 A1 | 6/2012 |
| DE | 10 2014 205 637 A1 | 10/2015 |

(Continued)

OTHER PUBLICATIONS

International Search Report in PCT/AT2020/060206, dated Oct. 12, 2020.

*Primary Examiner* — Sean Gugger
(74) *Attorney, Agent, or Firm* — Collard & Roe, P.C.

(57) ABSTRACT

A nacelle for a wind turbine, the nacelle includes: a nacelle housing; a rotor hub; and a rotor bearing for bearing the rotor hub on the nacelle housing, wherein the rotor bearing has at least one inner ring element and at least one outer ring element, wherein a first sliding bearing element and a second sliding bearing element are arranged between the two ring elements. Moreover, a bearing clearance adjusting device is formed, by which a bearing clearance between the sliding bearing element and the cooperating ring element may be adjusted.

7 Claims, 4 Drawing Sheets

(56) References Cited

U.S. PATENT DOCUMENTS

2014/0133985 A1   5/2014  Mongeau

FOREIGN PATENT DOCUMENTS

Figure 1:
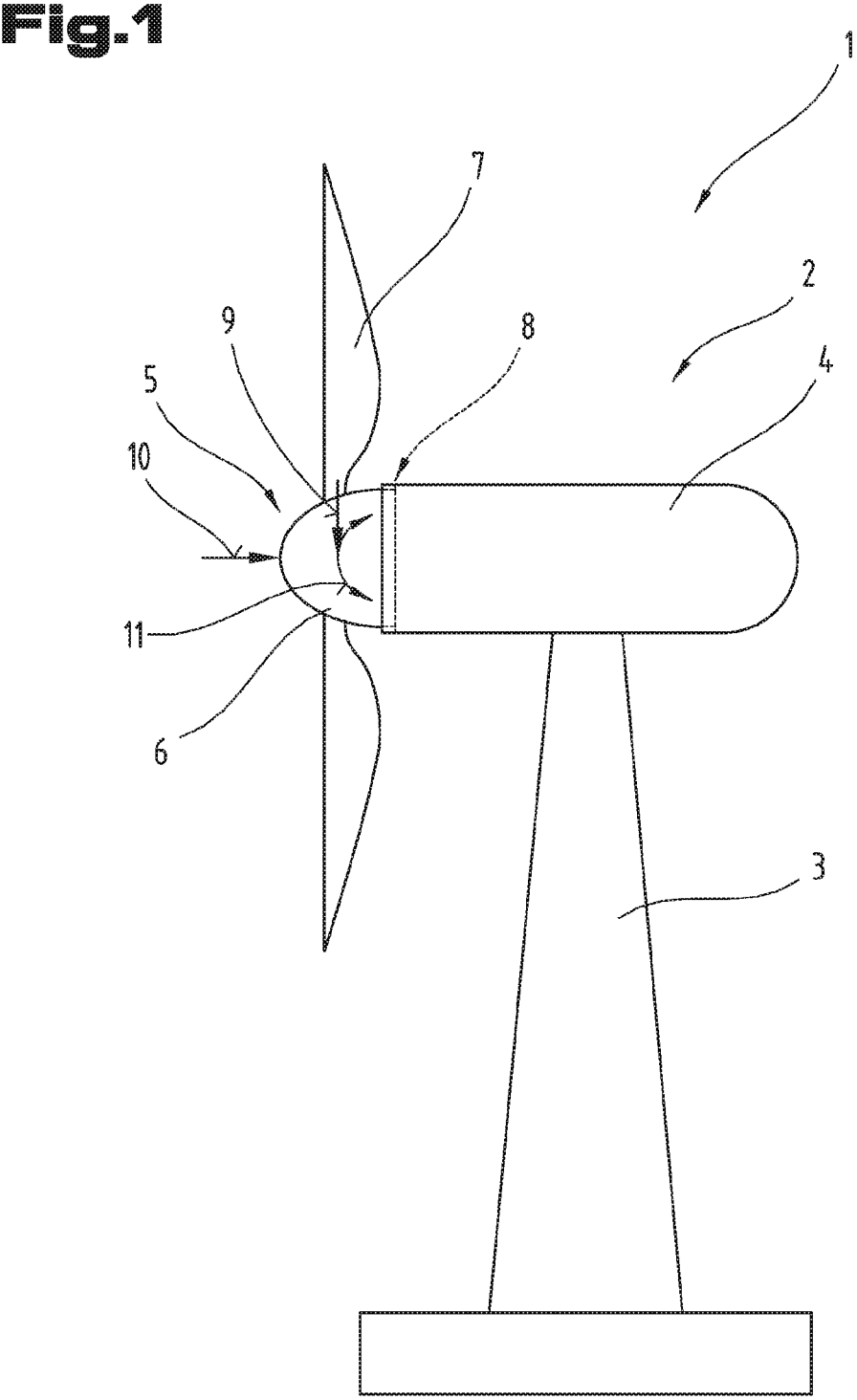

| DE | 10 2016 209 206 A1 | 12/2017 |
|----|---|---|
| DE | 10 2017 105 576 A1 | 9/2018 |
| EP | 1 365 147 A2 | 11/2003 |
| EP | 1 467 111 A2 | 10/2004 |
| EP | 2 863 076 A1 | 4/2015 |
| EP | 3 290 751 A1 | 3/2018 |
| WO | 2012/084665 A1 | 6/2012 |
| WO | 2015/144460 A1 | 10/2015 |
| WO | 2018/071941 A1 | 4/2018 |

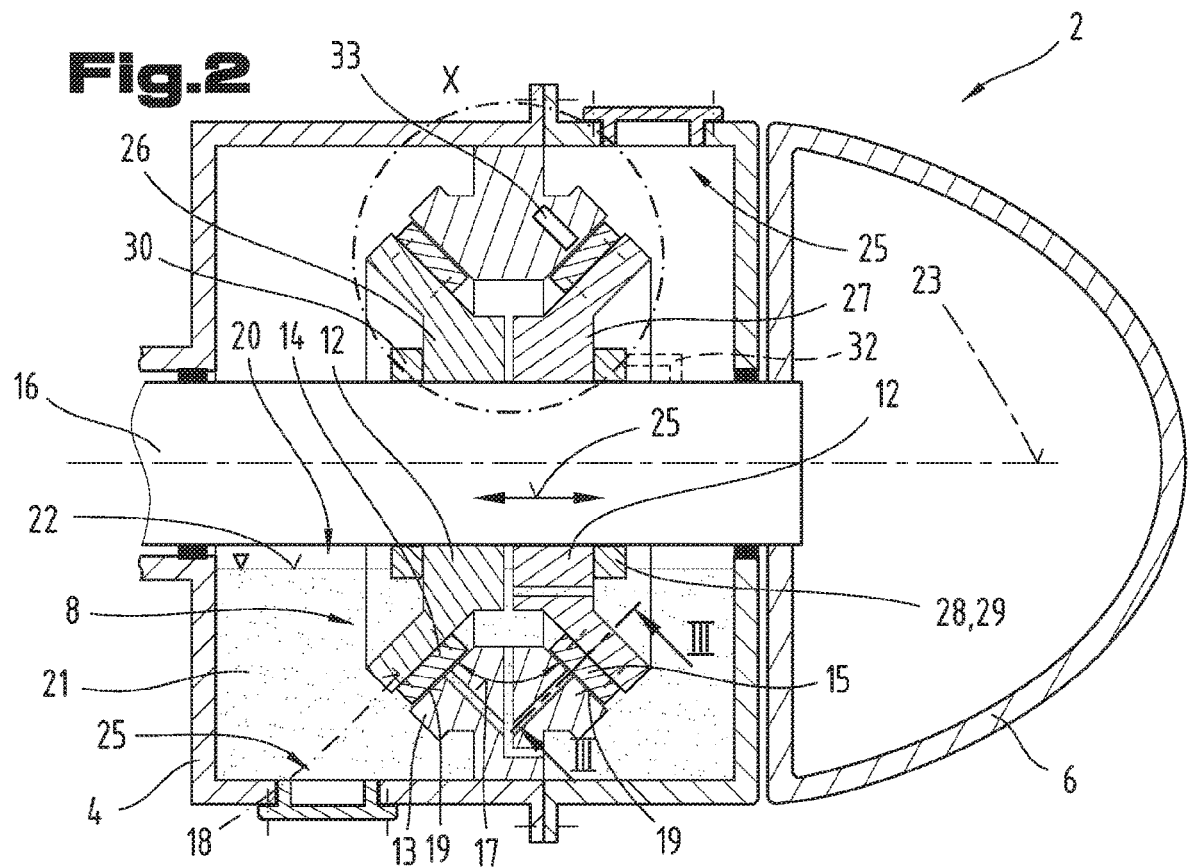
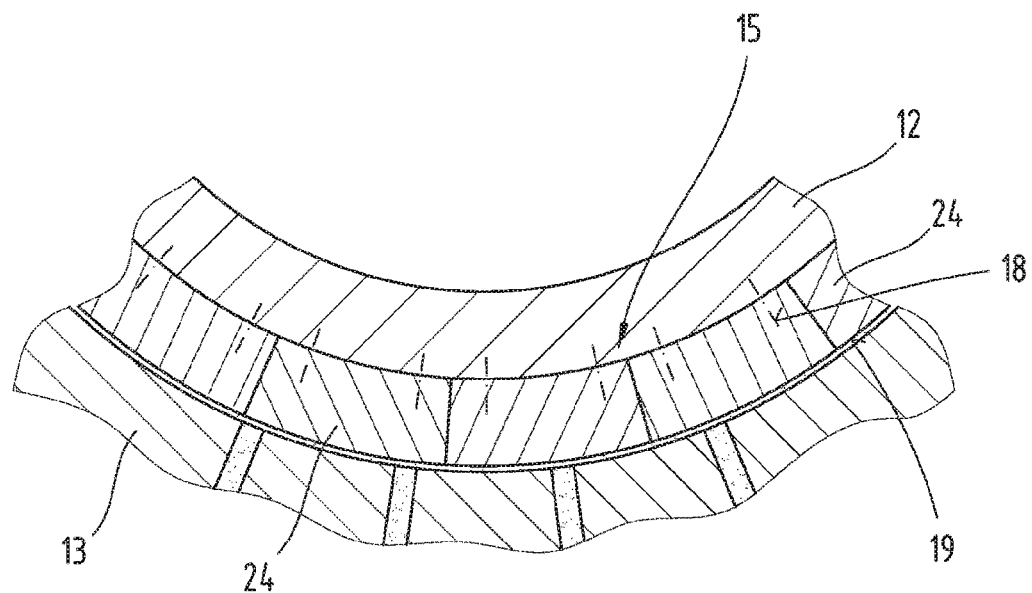

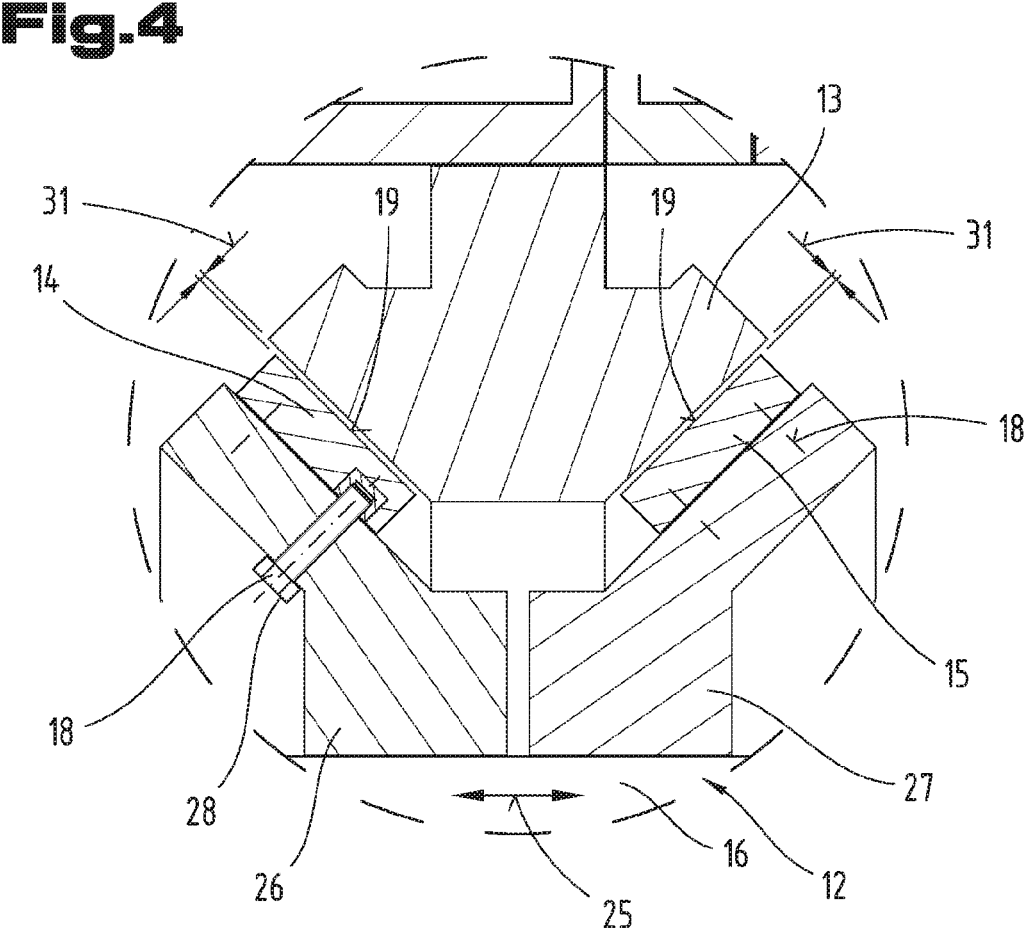

NACELLE FOR A WIND TURBINE

CROSS REFERENCE TO RELATED APPLICATIONS

This application is the National Stage of PCT/AT2020/060206 filed on May 19, 2020, which claims priority under 35 U.S.C. § 119 of Austrian Application No. A50465/2019 filed on May 21, 2019, the disclosure of which is incorporated by reference. The international application under PCT article 21(2) was not published in English.

The invention relates to a nacelle for a wind turbine as well as to a method for operating a wind turbine.

A rotor bearing for a wind turbine is known from EP 2 863 076 A1, wherein a flexibility of the sliding bearing pads is provided to compensate for their wear.

The rotor bearing known from EP 2 863 076 A1 has the disadvantage that the sliding bearing pads have only a short lifespan.

Further designs of multi-part sliding bearings are known from US 2014133985 A1, DE 10 2016 209 206 A1, DE 10 2014 205 637 A1, DE 10 2017 105 576 A1, WO 2018/071941 A1, as well as EP 3 290 751 A1.

It was the object of the present invention to overcome the shortcomings of the prior art and to provide a nacelle for a wind turbine which has an increased lifespan. Moreover, a method for operating the wind turbine is to be specified by means of which the increased lifespan may be achieved.

This object is achieved by means of a device and a method according to the claims.

According to the invention, a nacelle for a wind turbine is formed. The nacelle comprises:
  a nacelle housing;
  a rotor hub;
  a rotor bearing for bearing the rotor hub on the nacelle housing, wherein the rotor bearing has at least one inner ring element and at least one outer ring element, wherein a first sliding bearing element and a second sliding bearing element are arranged between the two ring elements. Moreover, a bearing clearance adjusting means is formed, by means of which a bearing clearance between the sliding bearing element and the cooperating ring element may be adjusted.

The nacelle according to the invention entails the surprising advantage that by the bearing clearance adjusting means according to the invention and the targeted adjustment of the bearing clearance, the wear of the sliding bearing elements may be reduced drastically. This surprising effect is attributed to the fact that a good sliding bearing effect between the sliding bearing element and the cooperating ring element may be established merely with an optimally adjusted bearing clearance.

Moreover, it may be useful if the ring element is designed such that it is divided axially into a first ring element part and a second ring element part, wherein the first ring element part and the second ring element part are displaceable relative to one another in the axial direction by means of the bearing clearance adjusting means. The bearing clearance may be adjusted surprisingly well and precisely in particular in such a design.

Moreover, it may be provided that the bearing clearance adjusting means comprises an axial securing ring, in particular a shaft nut. The axial distance of the two ring element parts to one another may be adjusted precisely in particular by means of a shaft nut. For example, a ring, which is for example clamped to the shaft by a clamping taper, may be used as the axial securing ring.

Moreover, it may be provided that both the inner ring element and the outer ring element are designed to be V-shaped and the first sliding bearing element and the second sliding bearing element are arranged between the two ring elements being axially spaced apart from one another, wherein the two sliding bearing elements are arranged at an angle with respect to one another as seen in cross-section. Particularly for V-shaped ring elements, it entails surprising advantages regarding the lifespan of the sliding bearing element if the bearing clearance is adjustable.

Moreover, it may be provided that the bearing clearance adjusting means comprises a spring element by means of which the first ring element part and the second ring element part are displaceable relative to one another in the axial direction. By means of the spring element, the bearing clearance may continuously be kept in a predefined value range, whereby the wear of the sliding bearing may be compensated for immediately. The spring element may, for example, be coupled to a component which is not displaceable in the axial direction, since the adjustment of the bearing clearance may be assumed by the spring element.

Moreover, it may be provided that the bearing clearance adjusting means comprises the spring element and the axial securing ring. By this combination, the bearing clearance may be continuously kept in a predefined value range by means of the spring element and the axial securing ring may be readjusted in periodic intervals, so as to be able to adjust the achievable value range of the spring element again.

In addition to this, it may be provided that the sliding bearing element comprises multiple individual sliding bearing pads which are arranged so as to be distributed across the circumference, wherein one bearing clearance adjusting means, by means of which the bearing clearance of each individual sliding bearing pad can be adjusted, is formed per sliding bearing pad. These measures also entail a surprisingly long lifespan of the sliding bearing elements. This entails the additional advantage that the bearing clearance may be independently adjusted for each individual bearing pad, whereby a further increase in the lifespan of the sliding bearing elements may be achieved. Hence, in particular, local stress zones resulting from the forces and tilting torques that occur can be taken into account in the bearing clearance settings.

An embodiment, according to which it can be provided that the bearing clearance adjusting means is coupled with a bearing clearance adjusting actuator by means of which the bearing clearance can be adjusted automatically, is also advantageous. Due to this measure, it is not required that the bearing clearance adjusting means is adjusted manually, whereby the accuracy of the bearing clearance setting may be improved which also results in an increase in the lifespan of the sliding bearing elements. In addition to this, by the autonomous setting of the bearing clearance, possibly occurring wear in the sliding bearing elements may be compensated for also during operation of the wind turbine.

The bearing clearance adjusting actuator may be actively controlled by external energy supply.

In an alternative embodiment variant, it may also be provided that the bearing clearance adjusting actuator is, for example, coupled with the rotor shaft or with the rotor hub via a gear and that the bearing clearance adjusting means is adjusted based on the already completed rotor rotations.

According to an advancement, it is possible that a bearing clearance detection means is formed, by means of which the bearing clearance may be detected. This entails the advantage that the actually abutting bearing clearance may be detected also during operation of the wind turbine and an action can be taken accordingly in the event of a deviation from the specified values.

The bearing clearance detection means may, for example, be formed in the form of a distance sensor. In particular, it may be provided that the bearing clearance detection means is formed in the form of an inductive sensor, in the form of a Hall sensor, or in the form of an optical distance sensor.

In particular, it may be provided that the bearing clearance detection means is arranged at a location of the rotor bearing, which is not stressed in operation of the wind turbine due to the applied tilting torque. By this measure, the actually abutting bearing clearance may be detected surprisingly well.

Moreover, according to the invention, a method for operating a wind turbine is provided, wherein a nacelle of the wind turbine comprises a rotor bearing having at least one inner ring element and at least one outer ring element, wherein a first sliding bearing element and a second sliding bearing element are arranged between the two ring elements. When the rotor bearing is assembled, a bearing clearance between the sliding bearing element and the cooperating ring element is set by means of a bearing clearance adjusting means. The assembly of the rotor bearing is considered to be all steps that take place prior to normal operation of the wind turbine. In particular, it may be provided that the bearing clearance is set only after a test operation of the wind turbine or after a break-in phase.

The method according to the invention entails the advantage that a thus operated wind turbine has a particularly long lifespan of the sliding bearing elements.

In addition to this, it may be provided that the bearing clearance is readjusted by means of the bearing clearance adjusting means in periodic intervals, in particular in the maintenance interval. By this measure, a wear of the sliding bearing elements may be compensated for.

Moreover, it may be provided that the bearing clearance is detected by means of a bearing clearance detection means, wherein when a certain bearing clearance value is reached, a bearing clearance adjusting means automatically adjusts the bearing clearance.

According to a particular embodiment, it is possible that the bearing clearance is detected by means of a bearing clearance detection means, wherein when a certain bearing clearance value is reached, a maintenance signal is output. Such a maintenance signal may, for example, be a message which is transmitted to a service center or to a service technician. Moreover, it is also conceivable that the maintenance signal is shown merely upon active retrieval of the operating state data of the corresponding wind turbine.

In addition to a nacelle housing, a nacelle within the meaning of this document also comprises a rotor hub and a rotor bearing for bearing the rotor hub.

The inner ring element and/or the outer ring element can each be formed as independent components, which may be coupled with the rotor hub or rotor shaft and/or with the nacelle housing. In the alternative to this, it is also conceivable that the inner ring element is formed as an integral element of the rotor hub and/or the rotor shaft. In the alternative to this, it is also conceivable that the outer ring element is formed as an integral element of the rotor hub and/or the rotor shaft. In the alternative to this, it is also conceivable that the inner ring element is formed as an integral element of the nacelle housing. In the alternative to this, it is also conceivable that the outer ring element is formed as an integral element of the nacelle housing.

Bearing clearance within the meaning of the present document is understood not only as the presence of a distance but, in the broadest sense, a negative bearing clearance is understood as a pretension of the sliding bearings. Thus, when the sliding surfaces of the sliding bearing abut on the corresponding ring element without applying a force thereon, the bearing clearance is zero. Therefore, a bearing clearance adjusting means by means of which a predefined or predefinable bracing or pretensioning of the rotor bearing, in particular a pressing force of the sliding surface of the sliding bearings, may be adjusted, is also covered by the scope of protection.

The bearing clearance adjusting means may, for example, be a component which is received in a positive locking manner, in particular by means of a thread, in the rotor bearing, and by means of which the bearing clearance may be determined directly. The bearing clearance adjusting means may, however, also be a resilient component, by means of which the bearing clearance may be adjusted depending on the force and by means of which the bearing clearance may be adjusted in a certain range due to its flexibility.

For the purpose of better understanding of the invention, it will be elucidated in more detail by means of the figures below.

Figure 5:
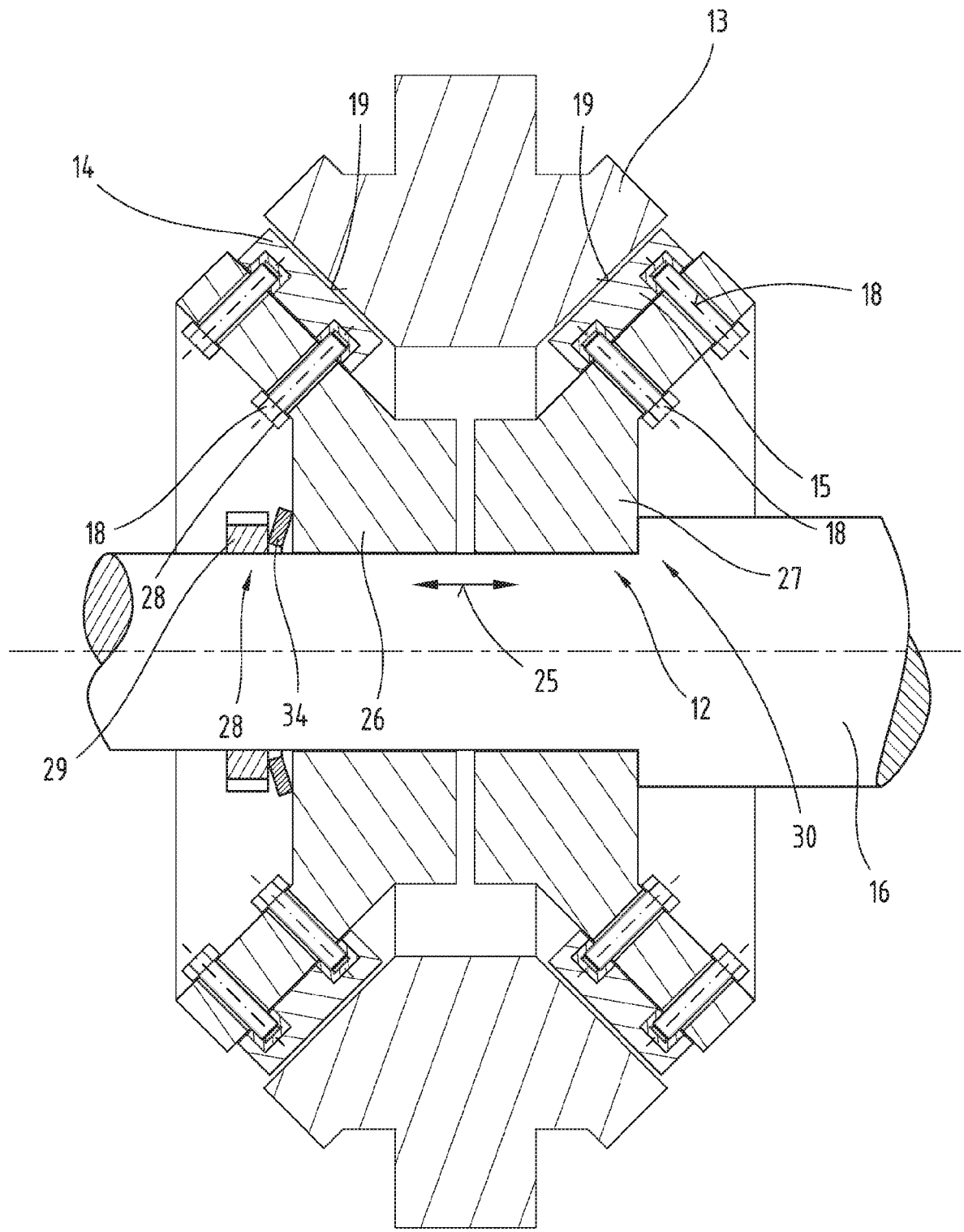

These show in a respectively very simplified schematic representation:

FIG. 1 a schematic representation of a wind turbine;

FIG. 2 a cross-section of a nacelle in a very schematic representation;

FIG. 3 a sectional view according to section line III-III in FIG. 3;

FIG. 4 a detail view of detail x of FIG. 2;

FIG. 5 a cross-sectional view of a further exemplary embodiment of a rotor bearing.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

FIG. 1 shows a schematic representation of a wind turbine 1 for generating electrical energy from wind energy. The wind turbine 1 comprises a nacelle 2, which is rotatably received on a tower 3. The nacelle 2 comprises a nacelle housing 4, which forms the main structure of the nacelle 2. In the nacelle housing 4 of the nacelle 2, the electrotechnical components such as a generator of the wind turbine 1 are arranged.

Moreover, a rotor 5 is formed, which has a rotor hub 6 with rotor blades 7 arranged thereon. The rotor hub 6 is considered part of the nacelle 2. The rotor hub 6 is received so as to be rotatable on the nacelle housing 4 by means of a rotor bearing 8.

The rotor bearing 8, which serves for bearing the rotor hub 6 on the nacelle housing 4 of the nacelle 2, is configured for absorbing a radial force 9, an axial force 10 and a tilting torque 11. The axial force 10 is caused by the force of the wind. The radial force 9 is caused by the weight force of the rotor 5 and is effective at the center of gravity of the rotor 5. As the center of gravity of the rotor 5 is outside the rotor bearing 8, the tilting torque 11 is generated in the rotor bearing 8 by the radial force 9. The tilting torque 11 may also be caused by an uneven load of the rotor blades 7.

The rotor bearing 8 according to the invention can have a diameter of 0.5 m to 5 m, for example. Of course, it is also conceivable that the rotor bearing 8 is smaller or larger. FIG. 2 shows the nacelle housing 4 and the rotor hub 6 in a schematic sectional representation, wherein the structure, in particular its dimensions, are highly schematized. As can be seen from FIG. 2, it may be provided that the rotor bearing 8 has at least one inner ring element 12 and least one outer ring element 13. At least one sliding bearing element 14, 15 is arranged between the inner ring element 12 and the outer ring element 13. In particular, it may be provided that a first sliding bearing element 14 and a second sliding bearing element 15 is arranged between the inner ring element 12 and the outer ring element 13.

As can be seen from FIG. 2, it may be provided that the inner ring element 12 is coupled with the rotor hub 6. In particular, it may be provided that a rotor shaft 16 is formed, on which the rotor hub 6 is arranged. The inner ring element 12 can be received directly on the rotor shaft 16.

In a further exemplary embodiment that is not depicted, it may of course also be provided that the inner ring element 12 is received directly on the rotor hub 6.

In yet another exemplary embodiment that is not depicted, it may of course also be provided that the inner ring element 12 is fastened to the nacelle housing 4, and that the rotor hub 6 is coupled with the outer ring element 13.

As can be seen from FIG. 2, it may be provided that both the inner ring element 12 and the outer ring element 13 are V-shaped, and two sliding bearing elements 14, 15 are each formed so as to be spaced apart from each other on the V-shaped flank between the two ring elements 12, 13.

In particular, it may be provided that the two sliding bearing elements 14, 15 are arranged at an angle 17 to one another. As can be seen from FIG. 2, an exemplary embodiment may provide that the sliding bearing elements 14, 15 are fastened to the inner ring element 12 by means of a fastening means 18. Hence, a sliding surface 19 may be formed between the sliding bearing elements 14, 15 and the outer ring element 13. In an arrangement of the sliding bearing elements 14, 15 as it is shown in FIG. 2, the sliding surfaces 19 may also be arranged in a V-shape.

As may also be seen from FIG. 2, it may be provided that the inner ring element 12, as seen in the axial direction 25, is designed so as to be divided into a first ring element part 26 and a second ring element part 27, in order to facilitate the assembly of the rotor bearing 8.

In an exemplary embodiment that is not depicted, it is of course also conceivable that the inner ring element 12 does not form a V-shaped groove as shown in the exemplary embodiment of FIG. 2, but rather that the V-shaped arrangement has a reverse formation, such that a V-shaped projection is formed on the inner ring element 12. In this case, it may be provided for facilitated assembly hat the outer ring element 13, as seen in the axial direction 25, is designed so as to be divided into the first ring element part 26 and the second ring element part 27.

In both the design with the inner ring element 12 being divided in the axial direction 25, as well as in a design with the outer ring element 13 being divided in the axial direction 25, it may be provided that the first ring element part 26 and the second ring element part 27 of the ring element 12, 13 are formed so as to be adjustable with respect to one another in the axial direction 25, in order to, for example, be able to compensate for the wear of the sliding bearing elements 14, 15. For this purpose, a bearing clearance adjusting means 28 is provided, by means of which the first ring element part 26 and/or the second ring element part 27 are displaceable relative to one another in the axial direction 25, whereby a bearing clearance 31 between the sliding bearing element 14, 15 and the ring element 12, 13 cooperating therewith may be adjusted.

As can be seen from FIG. 2, it may be provided that the bearing clearance adjusting means 28 is formed in the form of a shaft nut 29, by means of which the distance between the two ring element parts 26, 27 with respect to one another may be adjusted. In particular, it may be provided that a stop element 30 is formed which serves as a counter stop for the bearing clearance adjusting means 28. In other words, the first ring element part 26 and the second ring element part 27 may be received between the stop element 30 and the bearing clearance adjusting means 28.

As shown in FIG. 2, the stop element 30 may be formed by a separate component which is rigidly mounted on the rotor shaft 16. In a further exemplary embodiment shown in FIG. 5, it may also be provided that the rotor shaft 16 comprises a recess which serves as the stop element 30. In yet another exemplary embodiment, it may also be provided that the second ring element part 27 is, for example, firmly connected to the rotor shaft 16 by means of a materially bonded connection and thus no separate stop element 30 is required.

In particular, it may be provided that the bearing clearance 31 is adjusted according to the specifications when the rotor bearing 8 is mounted for the first time. It may also be provided that the bearing clearance 31 is readjusted at regular intervals to compensate for the wear of the sliding bearing elements 14, 15. In an advancement, it may also be provided that a bearing clearance adjusting actuator 32 is formed, by means of which the bearing clearance adjusting means 28 is movable and thus the bearing clearance 31 may be set and/or readjusted automatically.

In an advancement, it may be provided that a bearing clearance detection means 33 is provided, by means of which the currently present bearing clearance 31 may be detected.

In particular, it may be provided that the bearing clearance adjusting actuator 32 and the bearing clearance detection means 33 are coupled to a computing unit, whereby the bearing clearance adjusting actuator 32 adjusts the bearing clearance adjusting means 28 based on information gained by the bearing clearance detection means 33, so as to reach a predefined and/or predefinable bearing clearance 31.

As can further be seen from FIG. 2, it may be provided that a lubricating oil sump 20 is formed, which serves for receiving lubricating oil 21. In the operating state, the lubricating oil sump 20 can be filled with lubricating oil 21 up to a lubricating oil level 22. In this regard, the lubricating oil level 22 is selected such that the sliding surfaces 19 are at least partially below the lubricating oil level 22 and thus are immersed in the lubricating oil 21 situated in the lubricating oil sump 20.

In particular, it may be provided that the sliding bearing elements 14, 15 are arranged about a rotor axis 23.

FIG. 3 shows a sectional view according to section line III-III in FIG. 3.

As can be seen from FIG. 3, it may be provided that the sliding bearing element 14, 15 has multiple sliding bearing pads 24, which are arranged so as to be distributed across the circumference. The individual sliding bearing pads 24 can be coupled with and/or fastened on the inner ring element 12 by means of the fastening means 18. In particular, it may be provided that the individual sliding bearing pads 24 are independently releasable from the inner ring element 12 by means of the fastening means 18.

Moreover, it may also be provided that the fastening means 18 simultaneously act as bearing clearance adjusting means 28 and thus the bearing clearance 31 may be adjusted individually and independently from one another for each one of the individual sliding bearing pads 24.

FIG. 4 shows a detail view of the detail x of FIG. 2.

As can well be seen from FIG. 4, it may be provided that the first sliding bearing element 14 is fastened on the first ring element part 26 and that the second sliding bearing element 15 is fastened on the second ring element part 27 of the inner ring element 12. The sliding surfaces 19 of the sliding bearing elements 14, 15 may thus face the outer ring element 13. Thus, during operation of the wind turbine 1, the sliding surfaces 19 of the sliding bearing elements 14, 15 may slide on the outer ring element 13. As can further be seen from FIG. 4, it may be provided that in the unloaded ideal state of the rotor bearing 8, the bearing clearance 31 is formed between the sliding surface 19 and the outer ring element 13. As can be seen from FIG. 4, the bearing clearance 31 may actually be formed in the form of a distance. In a further exemplary embodiment, it may also be provided that, in the unloaded ideal state, the sliding surface 19 abuts on the outer ring element 13 and the bearing clearance 31 represents a measure for the pretensioning and/or the contact pressure of the sliding bearing element 14, 15 on the outer ring element 13.

The sliding bearing element 14, 15 which is actually in use is of course loaded with the forces acting the wind turbine 1, such as the radial force 9, the axial force 10 or the tilting torque 11. Thus, the actual bearing clearance 31 at the two sliding bearing elements 14, 15 or within one of the sliding bearing elements 14, 15 may differ in size.

As can be seen from FIG. 4, the fastening means 18 may simultaneously act as the bearing clearance adjusting means 28, whereby the position of the sliding bearing elements 14, 15 relative to the inner ring element 12 may be adjusted, whereby the bearing clearance 31 may be set.

FIG. 5 shows a further and possibly independent embodiment of the rotor bearing 8, wherein again, equal reference numbers and/or component designations are used for equal parts as in FIGS. 1 through 4 above. In order to avoid unnecessary repetitions, it is pointed to/reference is made to the detailed description in FIGS. 1 through 4 preceding it.

As can be seen from FIG. 2, it may be provided that the bearing clearance adjusting means 28 comprises a spring element 34, which is arranged between the shaft nut 29 and the ring element parts 26, 27. By means of the spring element 34, the wear of the sliding bearing elements 14, 15 may be compensated for directly. By means of the spring element 34, it may additionally be achieved that the sliding surfaces 19 of the sliding bearing elements 14, 15 abut on the outer ring element 13 with a predefined pressing force.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the technical teaching provided by the present invention lies within the ability of the person skilled in the art in this technical field.

The scope of protection is determined by the claims. Nevertheless, the description and drawings are to be used for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

LIST OF REFERENCE NUMBERS

1 Wind turbine
2 Nacelle
3 Tower
4 Nacelle housing
5 Rotor
6 Rotor hub
7 Rotor blade
8 Rotor bearing
9 Radial force
10 Axial force
11 Tilting torque
12 Inner ring element
13 Outer ring element
14 First sliding bearing element
15 Second sliding bearing element
16 Rotor shaft
17 Angle
18 Fastening means
19 Sliding surface
20 Lubricating oil sump
21 Lubricating oil
22 Lubricating oil level
23 Rotor axis
24 Sliding bearing pad
25 Axial direction
26 First ring element part
27 Second ring element part
28 Bearing clearance adjusting means
29 Shaft nut
30 Stop element
31 Bearing clearance
32 Bearing clearance adjusting actuator
33 Bearing clearance detection means
34 Spring element

The invention claimed is:

1. A nacelle (2) for a wind turbine (1), the nacelle (2) comprising:
a nacelle housing (4);
a rotor hub (6); and
a rotor bearing (8) for bearing the rotor hub (6) on the nacelle housing (4);
wherein the rotor bearing (8) has at least one inner ring element (12) and at least one outer ring element (13), wherein a first sliding bearing element (14) and a second sliding bearing element (15) are arranged between the two ring elements (12, 13), wherein a bearing clearance adjusting means (28) is formed, by means of which a bearing clearance (31) between the sliding bearing element (14, 15) and the cooperating ring element (12, 13) may be adjusted, wherein both the inner ring element (12) and the outer ring element (13) are designed to be V-shaped and the first sliding bearing element (14) and the second sliding bearing element (15) are arranged between the two ring elements (12, 13) being axially spaced apart from one another, wherein the two sliding bearing elements (14, 15) are arranged at an angle (17) with respect to one another as seen in cross-section, wherein the ring element (12, 13) is designed to be divided into a first ring element part (26) and a second ring element part (27), wherein the first ring element part (26) and the second ring element part (27) are displaceable relative to one another in the axial direction (25) by means of the bearing clearance adjusting means (28), wherein the bearing clearance adjusting means (28) comprises a spring element (34) and a shaft nut (29), by means of which the first ring element part (26) and the second ring element part (27) are displaceable relative to one another in the axial direction, wherein the spring element (34) is arranged between the shaft nut (29) and the first ring element part (26).

2. The nacelle (2) according to claim 1, wherein the sliding bearing element (14, 15) comprises multiple individual sliding bearing pads (24) which are arranged so as to be distributed across the circumference, wherein one bearing clearance adjusting means (28), by means of which the bearing clearance (31) of each individual sliding bearing pad (24) can be adjusted, is formed per sliding bearing pad (24).

3. The nacelle (2) according to claim 1, wherein the bearing clearance adjusting means (28) is coupled with a bearing clearance adjusting actuator (32), by means of which the bearing clearance (31) may be adjusted automatically.

4. The nacelle (2) according to claim 1, wherein a bearing clearance detection means (33) is formed, by means of which the bearing clearance (31) may be detected.

5. A method for operating a wind turbine (1), wherein a nacelle (2) of the wind turbine (1) comprises a rotor bearing (8) having at least one inner ring element (12) and at least one outer ring element (13), wherein a first sliding bearing element (14) and a second sliding bearing element (15) are arranged between the two ring elements (12, 13), wherein when the rotor bearing (8) is assembled, a bearing clearance (31) between the sliding bearing element (14, 15) and the cooperating ring element (12, 13) is set by means of a bearing clearance adjusting means (28), wherein both the inner ring element (12) and the outer ring element (13) are designed to be V-shaped and the first sliding bearing element (14) and the second sliding bearing element (15) are arranged between the two ring elements (12, 13) being axially spaced apart from one another, wherein the two sliding bearing elements (14, 15) are arranged at an angle (17) with respect to one another as seen in cross-section, wherein the ring element (12, 13) is designed to be divided into a first ring element part (26) and a second ring element part (27), wherein the first ring element part (26) and the second ring element part (27) are displaceable relative to one another in the axial direction (25) by means of the bearing clearance adjusting means (28), wherein the bearing clearance adjusting means (28) comprises a spring element (34) and a shaft nut (29), by means of which the first ring element part (26) and the second ring element part (27) are displaceable relative to one another in the axial direction, wherein the spring element (34) is arranged between the shaft nut (29) and the first ring element part (26).

6. The method according to claim 5, wherein the bearing clearance (31) is detected by means of a bearing clearance detection means (33), wherein when a certain bearing clearance value is reached, the bearing clearance adjusting means (28) automatically adjusts the bearing clearance (31).

7. The method according to claim 5, wherein the bearing clearance (31) is detected by means of a bearing clearance detection means (33), wherein when a certain bearing clearance value is reached, a maintenance signal is output.

\* \* \* \* \*